(12) United States Patent
Canuto Gil et al.

(10) Patent No.: US 12,264,051 B2
(45) Date of Patent: Apr. 1, 2025

(54) COMPACT AUTONOMOUS OMNIDIRECTIONAL DRIVE UNIT

(71) Applicant: UNIVERSITAT POLITECNICA DE CATALUNYA, Barcelona (ES)

(72) Inventors: Juan Jose Canuto Gil, Cornella de Llobregat (ES); Carlos Domenech Mestres, Barcelona (ES)

(*) Notice: Subject to any disclaimer, the term of this patent is extended or adjusted under 35 U.S.C. 154(b) by 855 days.

(21) Appl. No.: 17/599,622

(22) PCT Filed: Mar. 13, 2020

(86) PCT No.: PCT/EP2020/056858
§ 371 (c)(1),
(2) Date: Sep. 29, 2021

(87) PCT Pub. No.: WO2020/200697
PCT Pub. Date: Oct. 8, 2020

(65) Prior Publication Data
US 2022/0194763 A1     Jun. 23, 2022

(30) Foreign Application Priority Data

Mar. 29, 2019 (EP) .................................... 19382227

(51) Int. Cl.
| | | |
|---|---|---|
| B66F 9/06 | (2006.01) | |
| B60W 10/08 | (2006.01) | |
| B60W 10/12 | (2012.01) | |
| B65G 1/137 | (2006.01) | |
| B66F 11/04 | (2006.01) | |
| B60K 6/26 | (2007.10) | |
| B60K 7/00 | (2006.01) | |

(52) U.S. Cl.
CPC .............. B66F 9/063 (2013.01); B60W 10/08 (2013.01); B60W 10/12 (2013.01);
(Continued)

(58) Field of Classification Search
CPC ......... B66F 9/063; B66F 11/04; B60W 10/08; B60W 10/12; B60K 2006/266
(Continued)

(56) References Cited

U.S. PATENT DOCUMENTS

| | | | | |
|---|---|---|---|---|
| 4,530,056 A | * | 7/1985 | MacKinnon | ......... G05D 1/0272 701/25 |
| 2017/0196748 A1 | * | 7/2017 | Gaiser | .................... B62D 57/00 |

FOREIGN PATENT DOCUMENTS

| | | | | |
|---|---|---|---|---|
| CN | 107487739 | * | 8/2017 | .............. B66F 9/065 |
| CN | 109484516 | * | 3/2019 | ............. B62D 63/04 |

(Continued)

OTHER PUBLICATIONS

DE-102012023999 Machine Translation, Goetting, Jan. 2014 (Year: 2014).*

(Continued)

*Primary Examiner* — Jacob S. Scott
*Assistant Examiner* — Michael E Butler
(74) *Attorney, Agent, or Firm* — Eugenio J. Torres-Oyola; Victor M. Rodriguez-Reyes; Rafael Rodriguez-Muriel

(57) ABSTRACT

The present invention relates to an autonomous omnidirectional drive unit including a chassis (40) defining a front third (41), which contains a first drive wheel (11) with a first gearbox (13), a second drive wheel (21) with a second gearbox (23) coaxial with a horizontal geometric axis (EH), and a battery (30) between same, an intermediate third (42) which contains a first motor (12) and a second motor (22) connected to the first and second drive wheels (11, 21) and a vertical housing (70) between same concentric with a vertical geometric axis (EV); and a rear third which contains at least one caster wheel (50), the first and second motors (12, 22) being controlled by a control device (80) which generates control commands considering the distance (D) existing between the horizontal and vertical geometric axes (EH, EV).

14 Claims, 6 Drawing Sheets

(52) U.S. Cl.
 CPC ............ *B65G 1/1375* (2013.01); *B66F 11/04* (2013.01); *B60G 2204/182* (2013.01); *B60K 2006/266* (2013.01); *B60K 2007/0092* (2013.01)

(58) Field of Classification Search
 USPC .......................................... 701/22; 700/219
 See application file for complete search history.

(56) References Cited

FOREIGN PATENT DOCUMENTS

| DE | 102012023999 A1 | * | 1/2014 | ............ B62D 1/283 |
|----|----|----|----|----|
| DE | 102016210947 A1 | * | 12/2017 | ............ B62D 11/20 |
| WO | WO-2012048750 A1 | * | 4/2012 | ............ B62D 11/02 |
| WO | WO-2019020862 A1 | * | 1/2019 | ............ B25J 5/007 |

OTHER PUBLICATIONS

CN107487739 Machine Translation, Sun et al. Aug. 2017 (Year: 2017).*
WO-2019020862-A1, Machine Translation, Canuto et al. | Jan. 2019 (Year: 2019).*
WO-2012048750-A1, , Machine Translation Wittich, Apr. 2017 (Year: 2017).*
DE-102016210947-A1, Machine Translation,. Guhl, Dec. 2017 (Year: 2017).*
CN 109484516, Zhang et al., Mar. 2019 (Year: 2019).*

* cited by examiner

COMPACT AUTONOMOUS OMNIDIRECTIONAL DRIVE UNIT

FIELD OF THE ART

The present invention relates to a compact autonomous omnidirectional drive unit, i.e., a drive unit with the capability to follow a certain path by its own means without human intervention, which can furthermore move in any direction in a horizontal plane.

The proposed autonomous omnidirectional drive unit is of the type used in logistics warehouses or factories for transporting goods on the premises, typically placing the drive unit under a load to be transported and the drive unit lifting said load off the ground.

Other uses may be applicable to said drive unit, such as for example surveillance tasks, or by means of the incorporation of different accessories, such as a robotic arm, said drive unit can perform many other tasks.

STATE OF THE ART

Autonomous omnidirectional drive units are widely known.

A common configuration includes several self-orienting wheels and in the center of same two drive assemblies each formed by a drive wheel connected to an independent motor powered by a battery integrated in the drive unit itself, the two drive wheels facing and being coaxial with one another. The independent actuation of each drive wheel, and the central position thereof in the drive unit, allow said drive unit to rotate, move forward, move backward, or travel along a curved path.

Drive units of this type often include a vertical housing in the center of same, sandwiched between the two drive wheels, which integrates a lifting device provided for lifting a load placed above the drive unit, or at least for lifting a vertical coupling pin connecting the drive unit with a load equipped with wheels for dragging same.

Examples of drive units of this type are described in documents US2016209847A1, US2016288687A1, US2016297653A1, EP2168847A1, and FR3039104A1.

In the first four documents mentioned, the space existing between the two drive assemblies receives lifting mechanisms located in the mentioned vertical housing, the batteries being located in other peripheral areas of the drive unit, usually dividing the batteries into two symmetrical batteries to homogeneously distribute their weight in the drive unit. The non-central position of the batteries causes high inertias in the rotational movements of the drive unit which limit the rotational speed.

In contrast, the last document from the list with number FR3039104A1 proposes placing two narrow, elongated batteries traversing the entire the length of the drive unit, going between the two facing drive assemblies, said two batteries being separated by a distance which generates said vertical housing in which there is housed a lifting device which allows connecting the drive unit to a loading platform with wheels by means of a coupling pin.

However, in this solution the width of the drive unit is determined by the size of the vertical housing, by the thickness of the two batteries, and by the size of the two drive assemblies, which in this case include the drive motors concentric with the shaft of the drive wheels. This entire assembly determines an autonomous omnidirectional drive unit having a very substantial width and therefore a large-sized drive unit.

Furthermore, the use of two batteries makes the wiring of the drive unit more complicated and more expensive.

A more compact alternative solution which allows placing the batteries in a central position with respect to the drive wheels, reducing the inertia of the drive unit during rotations is therefore required.

Document EP2744741B1 is also known and it describes a drive unit of this type equipped with two facing and aligned drive assemblies separated by a distance, with an inductive device which allows supplying electric power to the drive unit by means of induction from the ground being located between them.

In this case, the drive unit does not have a battery or a vertical housing, because in this document the entire autonomous omnidirectional drive unit can be lifted, the drive assemblies moving downwards to achieve connection thereof with a transport platform equipped with wheels located thereon.

Documents DE102012023999A1 and WO2019020861 are also relevant state of the art documents referred to omnidirectional drive units.

BRIEF DESCRIPTION OF THE INVENTION

The present invention relates to a compact autonomous omnidirectional drive unit which, in a known manner, includes:
  a first drive assembly formed by a first drive wheel coaxial with a horizontal geometric axis, connected to a first motor, parallel to the horizontal geometric axis, through a first gearbox;
  a second drive assembly formed by a second drive wheel coaxial with said horizontal geometric axis, connected to a second motor, parallel to the horizontal geometric axis, through a second gearbox;
  a battery connected to said first and second motors;
  a chassis defining a rear third, an intermediate third, and a front third of the autonomous omnidirectional drive unit and a vertical geometric axis in the center of the chassis, said chassis supporting the first drive assembly and the second drive assembly spaced from one another in the direction of the horizontal geometric axis, and supporting one or more caster wheels;
  a horizontal transport platform located on the chassis for transporting loads;
  a vertical housing accessible through the transport platform, concentric with the vertical geometric axis and configured for allowing the passage of wiring from the drive unit to the transport platform and/or for containing a load lifting device configured for raising the transport platform or for lifting loads located on the transport platform in the direction of the vertical geometric axis;
  a control device is configured for controlling the first motor and the second motor by means of control commands generated by means of a calculation to produce an planned translation of the autonomous drive unit about the vertical geometric axis; Therefore, the proposed autonomous drive unit consists of a chassis driven by means of a first drive wheel and a second drive wheel that are coaxial with the horizontal geometric axis and actuated by a first motor and a second motor, the chassis furthermore being supported by one or more caster wheels.

A caster wheel will be understood to be a self-orienting wheel which orients itself in the forward movement direction of the drive unit, or an omnidirectional wheel which can rotate interchangeably in any direction, such as a ball wheel for example.

The chassis will also be understood to be formed by all the non-mobile parts of the autonomous omnidirectional drive unit with a structural or protective function.

A horizontal transport platform, intended for receiving loads on the autonomous omnidirectional drive unit for the transport thereof, is arranged on the chassis.

There is defined in the center of the chassis a vertical geometric axis and a vertical housing concentric with said vertical geometric axis traversing the transport platform, the vertical housing being provided for containing a lifting device which allows lifting loads located on the drive unit and/or provided for the passage of cables to or from the transport platform.

This configuration of the autonomous omnidirectional drive unit offers flexibility in use. The inclusion of a lifting device allows using the drive unit for the movement of goods, for example in logistics centers or factories, by placing the drive unit below loads which are raised up on legs or wheels and, by means of the actuation of the lifting device, connecting said loads to the drive unit either by lifting it, being supported on the drive unit, allowing the transport thereof, or else with the load being connected to the drive unit, allowing the dragging thereof.

Alternatively a fixed device with a specific function, such as, for example, a robotic arm, surveillance sensors, information panels, cleaning devices, etc. can be placed on the transport platform. In this case, the passage of wiring which connects the drive unit to the fixed device through the vertical housing is proposed, which allows, for example, controlling or coordinating said fixed device with the rest of the drive unit and/or powering the fixed device from the battery of the autonomous omnidirectional drive unit.

A control device calculates control commands needed to produce an planned translation of the drive unit by means of the independent actuation of the first and second motors.

It will be understood that the planned translation is the movement to be performed by the autonomous omnidirectional drive unit following a given path. In other words, the planned translation previously defines the path which the autonomous omnidirectional drive unit will follow during movement thereof.

Finally, three differentiated regions of the chassis corresponding to a front third, an intermediate third, and a rear third of the chassis are defined, each of said thirds corresponding to a transverse zone of the chassis which covers a third of the total length of the chassis with respect to a direction perpendicular to the horizontal and vertical geometric axes.

It will also be understood that the words front and rear do not determine a forward movement direction of the autonomous omnidirectional drive unit.

The present invention furthermore proposes, in a manner that is not known in the existing state of the art, that:
  said one or more caster wheels are located in the rear third;
  the first motor and the second motor are located in the central third, with the vertical housing being located between them;
  the first and second drive wheels are located in the front third, with the battery being housed between them, and with the horizontal geometric axis being spaced from the vertical geometric axis by a distance; and furthermore
  the control device is configured for performing said calculation directly or indirectly including the distance between the vertical and horizontal geometric axes as a calculation parameter.

Placing the first and second drive wheels in the front third of the chassis, moving the horizontal geometric axis away from the vertical geometric axis by a distance, allows the vertical housing to be located between said first and second drive wheels, freeing up that space.

It will be understood that the distance between the vertical and horizontal geometric axes will be the minimum distance measured in a direction perpendicular to said vertical and horizontal geometric axes.

It is proposed furthermore for the first motor and the second motor to be located in the intermediate third, with the rotating shafts of each of said first motor and second motor being located parallel to the horizontal geometric axis, with the vertical housing being located between said first and second motors within the central third of the chassis.

Placing the first drive wheel and the second drive wheel in the front third of the chassis, while at the same time leaving the first motor, the second motor, and the vertical housing in the central third, allows freeing up the space existing in the front third between the first and second drive wheels, which thereby allows locating battery there while at the same time achieving a compact and has a low height construction of the autonomous omnidirectional drive unit.

Positioning the battery between the first and second drive wheels reduces the inertia generated by the weight of said battery during rotation of the autonomous omnidirectional drive unit, allowing more precise rotations at a higher speed. Furthermore, the weight of the battery centered with respect to the first and second drive wheels assures correct grip of said wheels with the surfacing of the floor, which allows increasing the accelerations of said wheels.

Furthermore, this arrangement allows using a single battery, instead of two symmetrical batteries, as was usually done in drive units of this type, reducing and simplifying the wiring and therefore lowering the costs of the autonomous omnidirectional drive unit.

The arrangement of the first and second drive wheels in the front third and of the first and second motors in the intermediate third allows maintaining a smaller height of the autonomous omnidirectional drive unit, which is very advantageous, particularly when the autonomous omnidirectional drive unit is used for the transport of goods in logistics centers, given that the smaller height of the drive unit also allows using racks with little free space thereunder for placing the drive unit for the lifting and subsequent transport of said rack, and therefore increasing warehousing density.

The movement and rotation of the autonomous omnidirectional drive unit is preferably produced about a center of rotation located in the center of the chassis, coinciding with the vertical geometric axis, given that the inertia generated by a load placed on the transport platform and centered with respect to said vertical geometric axis is thereby reduced.

It is also very desirable for the autonomous omnidirectional drive unit to be capable of moving not only forwards and backwards, but it must also be capable of lateral translation without requiring a certain turning radius, as that allows the drive units to move in any environment and maneuver in spaces that are only somewhat larger than the size of the chassis.

When the horizontal geometric axis intersects the vertical geometric axis, lateral translation of the autonomous omnidirectional drive unit can be achieved by means of the simultaneous and equal actuation of the first and second drive wheels, but in inverse directions, generating the rotation of the drive unit about the vertical geometric axis without travelling, to then produce the forward movement.

However, as the first and second drive wheels are moved to the front third of the chassis, moving the horizontal geometric axis away from the vertical geometric axis, said rotation about the vertical geometric axis without producing forward movement is no longer possible.

Despite the foregoing, with this solution it is possible to move forward by means of lateral translation of the lateral geometric axis, causing the rotation of the autonomous omnidirectional drive unit about the vertical geometric axis simultaneously with respect to said forward movement by means of precise control of the actuation of the first and second drive wheels.

The calculation of the control commands necessary for obtaining said translation of the autonomous omnidirectional drive unit with respect to the vertical geometric axis requires complicated calculation operations, which must include, whether directly or indirectly, the separation distance existing between the vertical geometric axis and the horizontal geometric axis.

It is therefore proposed for the control device to be configured, once the planned translation is determined, for then calculating the control commands of the first motor and of the second motor actuating the first wheel and the second wheel, taking into account the mentioned separation distance between the vertical and horizontal geometric axes as one of the calculation parameters which allow obtaining the control commands.

Therefore, despite the fact that the first and second drive wheels are not aligned with the vertical geometric axis, it is possible for the autonomous omnidirectional drive unit to travel in any direction, including lateral translation without a turning radius.

According to an additional embodiment of the present invention, the following is proposed:
- the first gearbox is at least partially surrounded by the first drive wheel, the first drive wheel being supported on a casing of said first gearbox by a first interposed bearing;
- the second gearbox is at least partially surrounded by the second drive wheel, the second drive wheel being supported on a casing of said second gearbox by a second interposed bearing.

Placing the first drive wheel around the first gearbox, supported on its casing by means of the first hollow bearing, allows compacting the first drive assembly, reducing its dimension in the direction of the horizontal geometric axis.

Placing the second drive wheel around the second gearbox, supported on its casing by means of the second hollow bearing, allows compacting the second drive assembly, reducing its dimension in the direction of the horizontal geometric axis.

As a result, the space available between the first and second drive wheels where the battery is housed in increased, thereby achieving a more compact autonomous omnidirectional drive unit.

It is proposed for the first bearing to be concentric with a first output shaft of the gearbox and with the horizontal geometric axis, the first drive wheel including a hubcap or a rim connected to said first output shaft. An identical construction is proposed for the second drive wheel.

Preferably, the first gearbox and the second gearbox will be epicyclic gearboxes, which are typically very compact and efficient.

According to another embodiment, the first motor is connected to the first gearbox through a first transmission belt or chain, and wherein the second motor is connected to the second gearbox through a second transmission belt or chain.

According to this embodiment, the first gearbox will include a first input shaft equipped with a wheel or with a gear, and the first motor will be connected to a wheel or gear also. A transmission belt or chain connecting said wheels or gears of the first gearbox and of the first motor will transfer the rotation of the first motor to the first input shaft. This solution allows spacing the first motor from the first gearbox, placing the first motor on one side of the first wheel.

An identical construction is proposed for the second drive assembly.

According to a proposed additional embodiment, the transport platform is rotational about a hollow platform bearing concentric with the vertical geometric axis and actuated by a rotary motor. Preferably, the rotary motor will be controlled by the control device.

As mentioned above, the vertical housing is accessible through the transport platform and concentric with the vertical geometric axis, so said vertical housing will also be concentric with the axis of rotation of the rotary transport platform, and said transport platform will have a hole in the center of same which allows access to the vertical housing, the platform bearing being located around same.

The rotation of the transport platform allows, in combination with the omnidirectional translation, a load placed on the transport platform to move in any direction, to rotate while it is moving, or to move while the drive unit performs a rotation, but without the load rotating by means of a counter-rotation of the transport platform which compensates for the rotation of the drive unit.

According to a preferred embodiment of the rotary transport platform, this will include a platform gear concentric with the vertical geometric axis meshed with a turning gear connected to the rotary motor. The platform gear will preferably be a circular ring which defines a toothed hollow interior and the periphery of which is supported on the platform bearing.

It is also proposed for the vertical housing to furthermore include rotary electrical connectors, i.e., connectors with the capacity to transmit electricity between two parts thereof which can rotate freely one with respect to the other, typically through circular conductive tracks. This allows, in the case of connecting a fixed load placed on the rotary loading platform with the rest of the autonomous omnidirectional drive unit by means of cables, introducing said cables in the vertical housing and connecting them to the rotary electrical connectors, allowing the free rotation of the rotary transport platform without the connection being interrupted.

According to another proposed embodiment, the first drive wheel and the second drive wheel each includes an angular position sensor which communicate angular position readings to the control device, and wherein the control device is configured for, after generating the control commands and producing the planned translation of the autonomous omnidirectional drive unit, calculating the actual translation of the autonomous omnidirectional drive unit from the angular position readings, and detecting a discrepancy between the actual translation and the planned translation.

This feature allows the control device to verify if the actual translation experienced by the autonomous omnidirectional drive unit corresponds precisely with the translation planned before the movement.

There are often small imperfections or parts with certain play which bring about a difference between the result provided by certain control commands and the actual result obtained from the application of said control commands. The difference may be very small, but in a moving drive unit said difference gradually accumulates after each control command and may become considerable.

It is also proposed for the control device to be configured for performing said calculation for the generation of control commands, furthermore including the mentioned discrepancy detected in prior translations as a parameter, which allows correcting the actual position of the drive unit, preventing the accumulation of discrepancies.

In other words, if a discrepancy is detected after performing translation of the drive unit following control commands, the control device will be configured for taking into account said discrepancies in the calculation of the following control commands, for the purpose of correcting the discrepancy by means of subsequent translations of the autonomous omnidirectional drive unit.

It is also proposed for the average width of the projection onto a horizontal plane of the intermediate third, in a direction parallel to the horizontal geometric axis, to be greater than the average width of the projection onto a horizontal plane of the front third and greater than the average width of the projection onto a horizontal plane of the rear third in a direction parallel to the horizontal geometric axis.

This determines a chassis having its maximum width in the central third and narrowing at the ends. Ideally the drive unit must be inscribed in a circle concentric with the vertical geometric axis that is as small as possible in order to facilitate the rotations thereof, and reducing the width of the drive unit at the end thirds helps to achieve this.

It is also proposed for the maximum length of the autonomous omnidirectional drive unit, in a direction perpendicular to the horizontal and vertical geometric axes, to measure at most ±15% of the length of the maximum width of the autonomous omnidirectional drive unit, in a direction parallel to the horizontal geometric axis. In other words, the maximum width and the maximum length of the drive unit are equal or similar, with the maximum difference being less than 15%.

This feature determines a compact drive unit which is not elongated, but rather square or circular, thereby facilitating its being inscribed in a circle as mentioned above.

According to a preferred embodiment of the invention, the caster wheels are two caster wheels which are connected to one another by means of an arm, and wherein
the arm is a rigid arm attached at its center to the chassis by means of an articulation the shaft of which rotates about an axis perpendicular to the vertical and horizontal axes; or
the arm is a rigid arm connected to the chassis through one or more elastic elements subjected to compression, pushing, through the rigid arm, the caster wheels in a downward direction against the ground; or
the arm is a flexible arm attached at its center to the chassis, the flexible arm being subjected to flexing, pressing the caster wheels against the ground in a downward direction.

Any of these three embodiments acts as a suspension which determines that the vertical position of the caster wheels can be modified, allowing the drive unit to keep the two caster wheels in contact with the ground at all times even if said ground has irregularities, thereby assuring that the two drive wheels are kept in contact with the ground at all times preventing them from skidding, which could constitute a considerable deviation from their position after translation.

It is alternatively proposed for each caster wheel to be connected to the chassis through one or more elastic elements subjected to compression, elastically pushing the caster wheels in a downward direction against the ground, eliminating the arm interposed between the caster wheels and the chassis.

The autonomous omnidirectional drive unit will evidently also include a plurality of sensors connected to the control device, which will be configured for detecting, through said sensors, obstacles, position marks, circulation rails, movement objectives, or other parameters which allow the drive unit to autonomously move around a conditioned environment. Said sensors can include cameras, laser sensors, ultrasonic sensors, barcode or QR code readers, magnetic antennas, radio frequency antennas, etc.

It will be understood that references to geometric positions, such as, for example, parallel, perpendicular, tangent, etc., allow deviations of up to ±5° with respect to the theoretical position defined by said nomenclature.

It will also be understood that any range of values that is offered may not be optimal as regards its end values and may require adaptations of the invention so that said end values are applicable, with said adaptations being within reach of one skilled in the art.

Other features of the invention will become apparent in the following detailed description of an embodiment.

BRIEF DESCRIPTION OF THE DRAWINGS

The foregoing and other advantages and features will be fully understood based on the following detailed description of an embodiment in reference to the attached drawings, which must be interpreted in an illustrative and non-limiting manner, in which:

FIG. 7 shows three schematic elevational views of the rear third of the autonomous omnidirectional drive unit corresponding to three embodiments in which the caster wheels have freedom of vertical movement as a result of the

DESCRIPTION DETAILED OF AN EMBODIMENT

The attached drawings show illustrative and non-limiting embodiments of the present invention.

Figure 1:
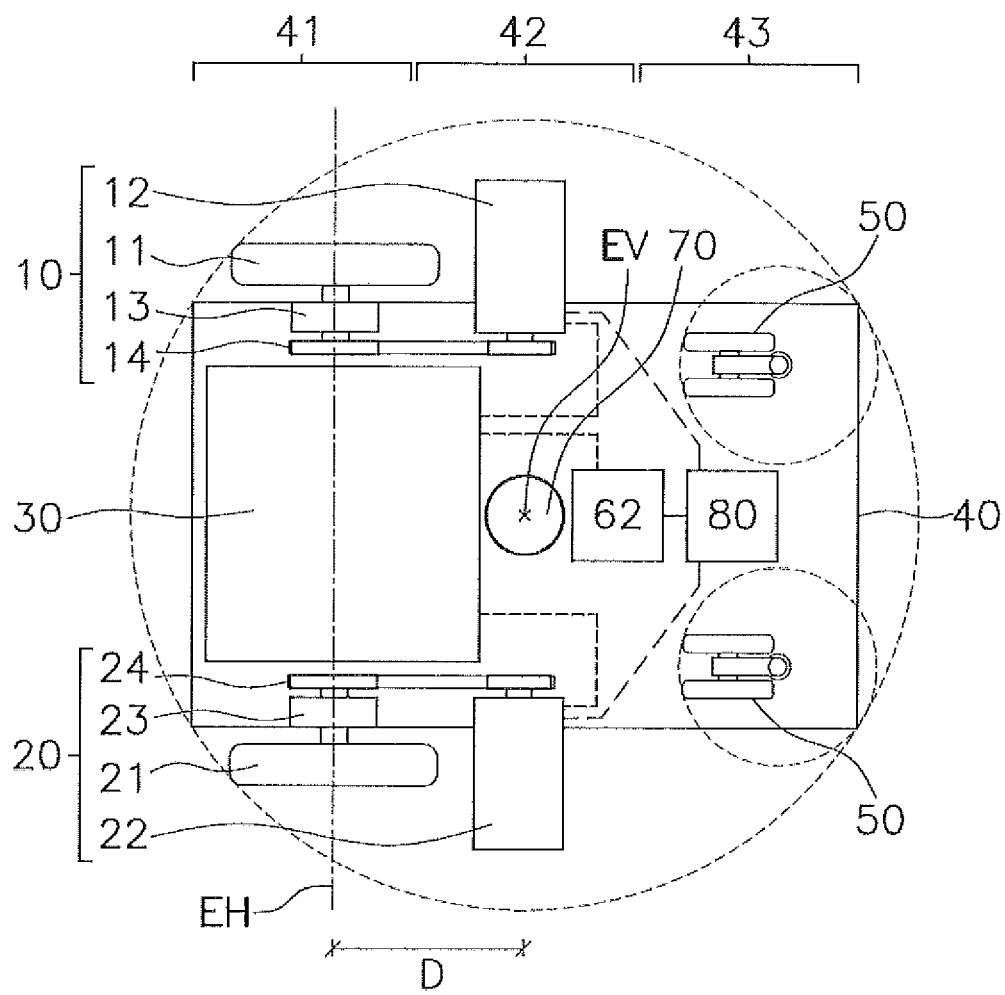
FIG. 1 shows a schematic plan view of the autonomous omnidirectional drive unit, showing, with a straight discontinuous line, the electrical and signal connections between the different components of the drive unit and showing, with a discontinuous circular line, the turning radius of both the autonomous omnidirectional drive unit and of each of the caster wheels.
Figure 2:
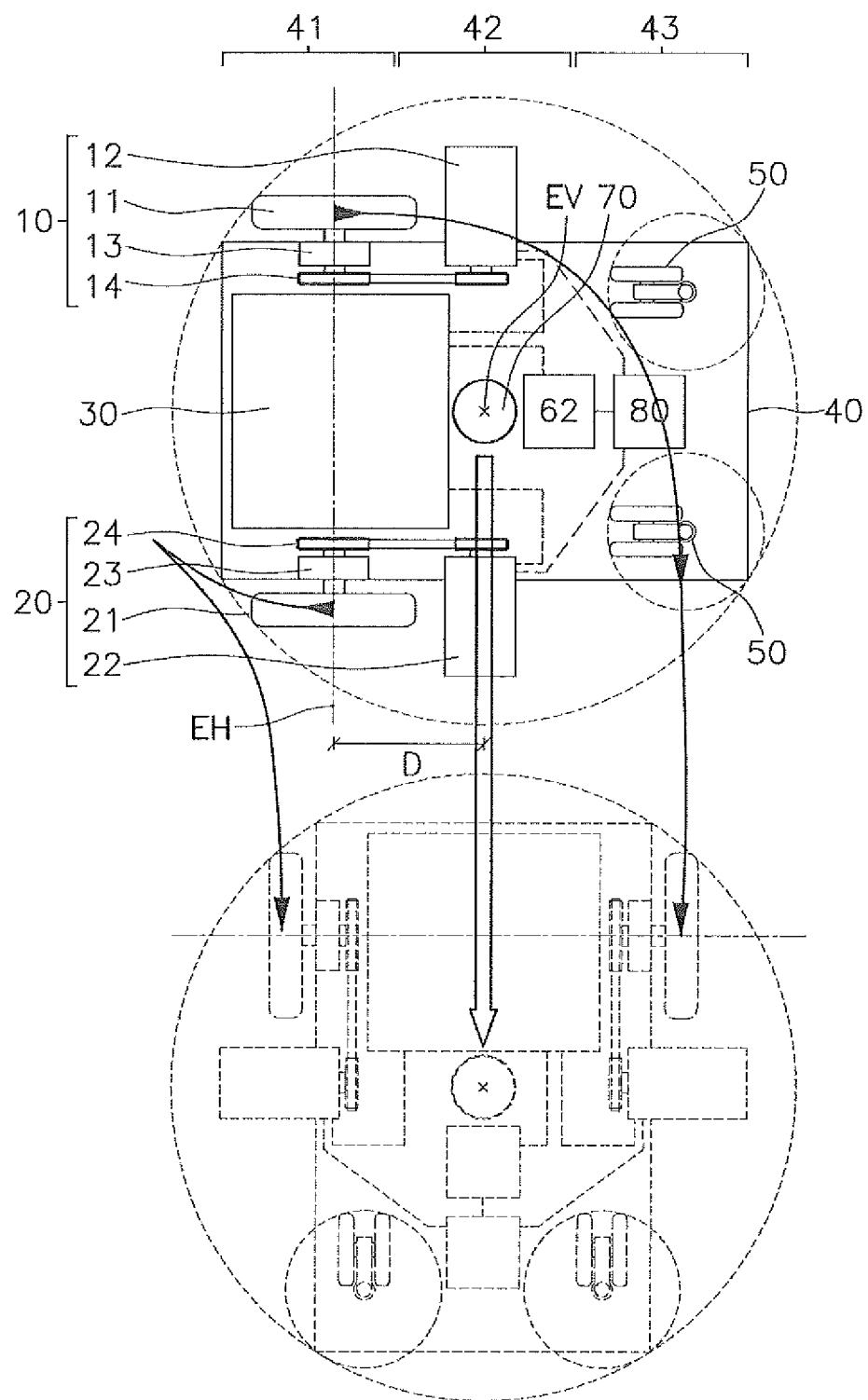
FIG. 2 shows the same schematic plan view of FIG. 1, but including an example of a lateral translation path of the drive unit indicated by means of arrows, as well as the final position of the drive unit after said translation indicated with faint discontinuous line.
Figure 4:
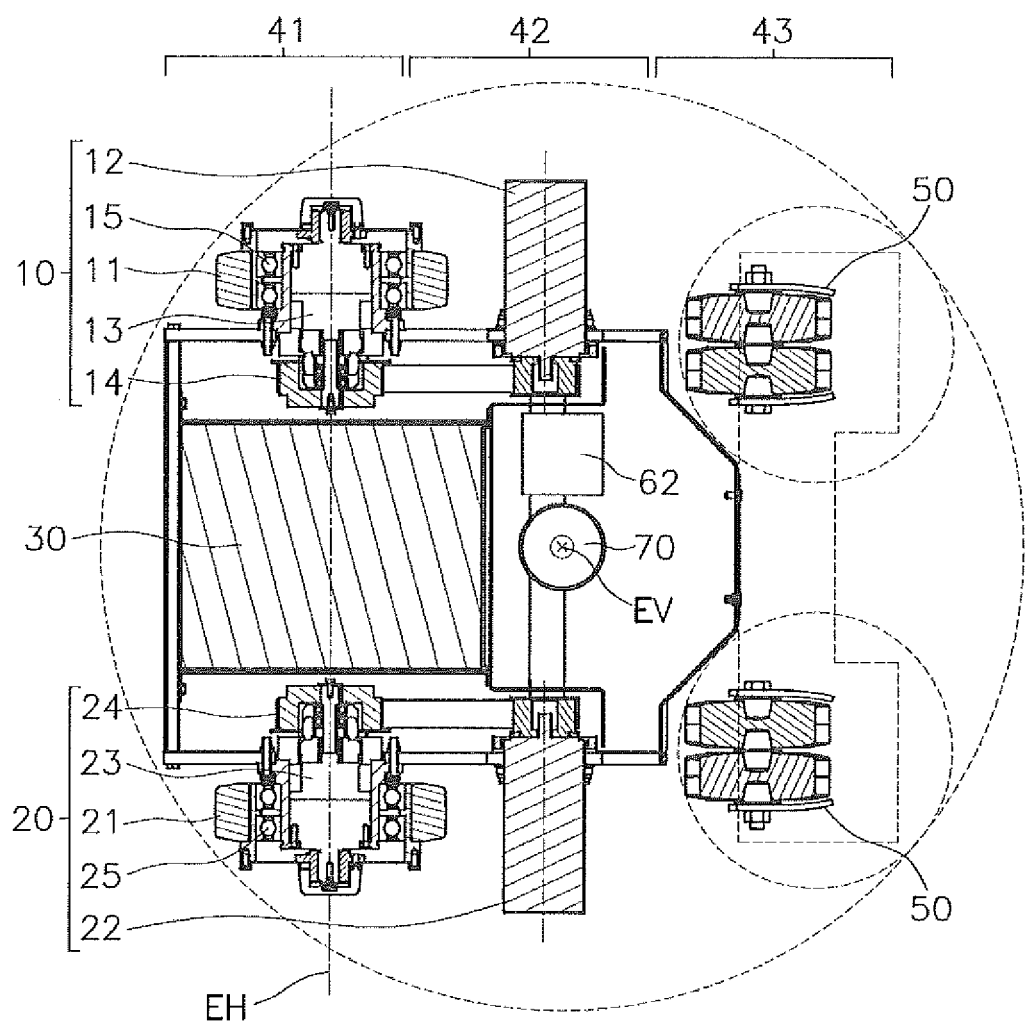
FIG. 4 shows a detailed plan view of the autonomous omnidirectional drive unit shown in FIG. 3.

FIGS. 1, 2, and 4 show a plan view of the proposed autonomous omnidirectional drive unit.

The mentioned drive unit consists of a chassis 40 supporting a first drive assembly 10 and a second drive assembly 20, a battery 30, and two caster wheels 50, in addition to a control device 80.

The first drive assembly 10 includes a first drive motor 11 connected by means of a transmission belt 15 with a first gearbox 13 which is in turn connected to a first drive wheel 11.

It is proposed for the gearbox 13 to be an epicyclic gearbox, i.e., equipped with planetary gears and preferably an input shaft and a output shaft that are concentric with respect to one another.

The first drive wheel 11 will be concentric with a horizontal geometric axis EH, the input shaft and the output shaft of the first gearbox 13 also being concentric with said horizontal geometric axis EH.

The first motor 12 includes an output shaft parallel to the horizontal geometric axis EH, the first motor 12 being laterally adjacent to the first drive wheel 11, i.e., located on a side thereof. The output shaft of the first motor 12 is connected by means of a belt to the input shaft of the first gearbox 13.

As shown in FIG. 4, it is furthermore proposed for the first gearbox 13 to be inserted into the first drive wheel 11 by going through it, with the first drive wheel 11 being supported around a casing of the first gearbox 13 by means of a first bearing 15 and with the input shaft of the first gearbox 13 being on the inner side of the first drive wheel 11 and with the output shaft of the first gearbox 13 being on the outer side of the first drive wheel 11.

Figure 3:
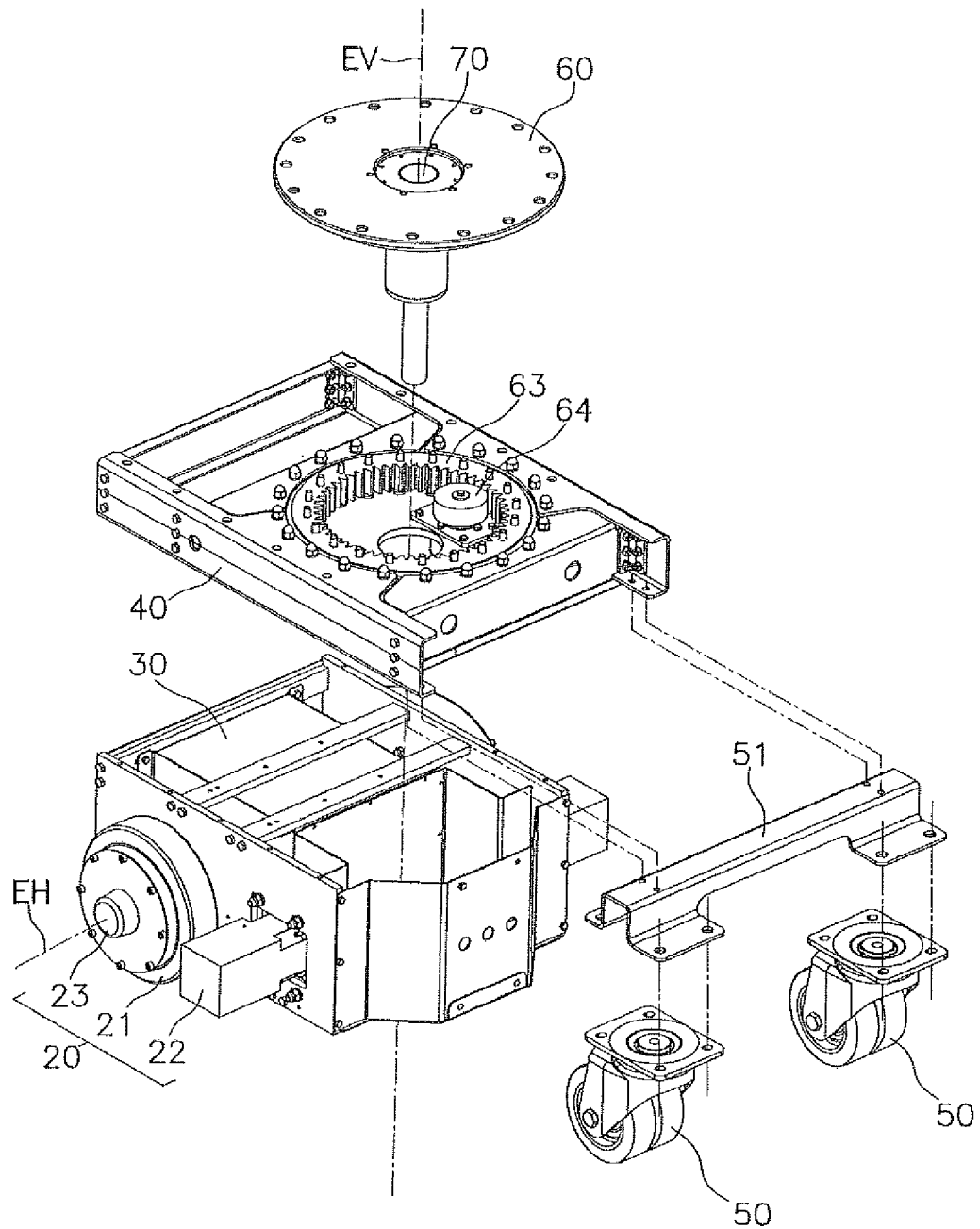
FIG. 3 shows a detailed exploded perspective view of an embodiment of the autonomous omnidirectional drive unit.

The output shaft of the first gearbox 13 is connected to the first drive wheel 11 through a disc located on the outer side of the first drive wheel 11, as can be seen in FIG. 3.

The second drive assembly 20 includes a second drive wheel 21, a second gearbox 23 connected to a second motor 22 through a second belt 24, with the construction of the second drive assembly 20 being identical to that of the first drive assembly 10, and with the second drive wheel 21 also being concentric with the mentioned horizontal geometric axis EH, the first drive assembly 10 and the second drive assembly 20 facing one another.

This construction of the first drive assembly 10 and of the second drive assembly 20 allows them to be very compact in the direction of the horizontal geometric axis EH, so both drive assemblies 10, 20 can be supported by the chassis 40 leaving a distance between them, creating an intermediate space between the first and second drive wheels 11, 21 which receives the battery 30.

The proposed autonomous omnidirectional drive unit includes on same a transport platform 60 intended for supporting loads to be transported. Said loads can be, for example, goods to be moved, such as racks containing a plurality of assorted goods, such as a shelving unit, for example. In such case, the drive unit must have the capacity to be placed below said loads and lifting them, loading their weight on the autonomous omnidirectional drive unit.

Alternatively, the loads can be equipment loads which add features to the autonomous omnidirectional drive unit such as, for example, a robotic arm, surveillance sensors, an information display, etc. In such case, said equipment would require wiring providing them with electric power and/or control signals which must enable being connected to the rest of the autonomous omnidirectional drive unit.

In either of the two cases, the autonomous omnidirectional drive unit would require complementary devices which allow it to perform said functions, keeping the autonomous omnidirectional drive unit compact and with a low height.

The chassis 40 is divided, in the forward movement direction of the drive unit, into three portions, each one corresponding to a third of its length, defining a front third 41, an intermediate third 42, and a rear third 43 of the drive unit.

The first motor 12 and the second motor 22 are located in the intermediate third 42.

To lift the aforementioned load in an efficient manner, and assuring that the load will not destabilize the autonomous omnidirectional drive unit, and without a significant increase of the plan size or height of the autonomous omnidirectional drive unit, the invention proposes using a single load lifting device located in the intermediate third 42 of the chassis 40 and configured for raising the transport platform 60 or for lifting loads located on the transport platform 60 in the direction of a central vertical geometric axis EV of said intermediate third 42.

To allow incorporating said load lifting device, the invention proposes including, in the intermediate third 42 of the chassis 40 between the first motor 12 and the second motor 22, a vertical housing 70 concentric with the vertical geometric axis EV, which will preferably be accessible through the transport platform 60 and could house the mentioned lifting device.

To allow connecting the wiring between the autonomous omnidirectional drive unit and the equipment located on the transport platform 60, it is also proposed for the mentioned vertical housing 70 to be used as a passage for said wiring and for housing connectors which allow a simple connection and disconnection of said wiring.

In the embodiment in which the transport platform 60 is rotary, it is proposed for the vertical housing 70 to include also rotary electrical connectors 71 which transmit power and signal, allowing the rotation of the transport platform 60, and of any equipment supported thereon, with respect to the rest of the autonomous omnidirectional drive unit, said rotary electrical connectors 71 being concentric with the vertical geometric axis EV.

Optionally, it is also proposed for the vertical housing 70 to include a casing connected to said transport platform 60 for rotating integrally with same. In such case, a lifting device incorporated in the vertical housing 70 would rotate together with the transport platform 60, so the electrical and signal connection between the lifting device and the rest of the autonomous omnidirectional drive unit would also be produced through the mentioned rotary electrical connectors 71.

The position of the vertical geometric axis EV and of the vertical housing 70 corresponds with the center of rotation of the autonomous omnidirectional drive unit, i.e., the translational movement of the autonomous omnidirectional drive unit is performed about said vertical axis EV, taking said vertical geometric axis EV as the origin and reference point for the calculation of the control commands generated by the control device 80.

Since the autonomous omnidirectional drive unit is compact and has a low height, different components of the autonomous omnidirectional drive unit should not be placed stacked on one another, but rather they should preferably be placed on the same level, one next to the other, thereby reducing the height of the drive unit.

The central position of said vertical housing 70 located in the intermediate third 42 prevents placing other devices, such as the battery 30, for example, in said intermediate third 42.

The conventional solution in these cases consists of dividing the battery 30 into two batteries located in a symmetrical manner in the front third 41 and in the rear third 43 to balance the drive unit, but this solution complicates the construction, produces more wiring, and makes the drive unit more expensive, in addition to moving the weight of the batteries away from the center of rotation of the drive unit, increasing the inertia produced during rotations.

The present invention proposes placing a single battery 30 which will be housed for the most part in the front third 41. To prevent harmful effects due to the off-centered position of the weight of the battery 30, the invention proposes placing the first drive wheel 11 and the second drive wheel 21 also in the front third 41, on both sides of the battery 30, with the horizontal geometric axis EH, which is concentric with the first and second drive wheels 11, 21, being moved a distance D away from the vertical geometric axis EV located in the intermediate third 42.

This construction allows the weight of the battery 30 to be centered with respect to the first and second drive wheels 11, 21, therefore reducing the inertia produced by the weight of the battery 30 during rotations.

However, the off-centered position of the first and second drive wheels 11, 21 with respect to the vertical geometric axis EV, the center of rotation of the autonomous omnidirectional drive unit, requires the control device 80 in charge of generating the control commands which determine the actuation of the first and second drive motors 12, 22, to be configured for taking into account said eccentricity, including the distance D as one of the parameters used for calculating said control commands.

An example of the omnidirectional movement of the autonomous omnidirectional drive unit is shown in FIG. 2, which shows the autonomous omnidirectional drive unit in an initial position, and with a discontinuous line, in a final position. This figure indicates by means of arrows the approximate path which each of the first drive wheel 11, second drive wheel 21 must follow for obtaining a straight lateral movement of the vertical geometric axis EV (in a direction parallel to the horizontal geometric axis EH in its initial position).

As can be seen in this figure, the path of the first and second drive wheels 11 and 21 must be coordinated in a precise manner to obtain said straight lateral movement of the vertical geometric axis EV. In this example, the second drive wheel 21 must even change its direction of rotation during travel to achieve the desired movement.

Figure 5:
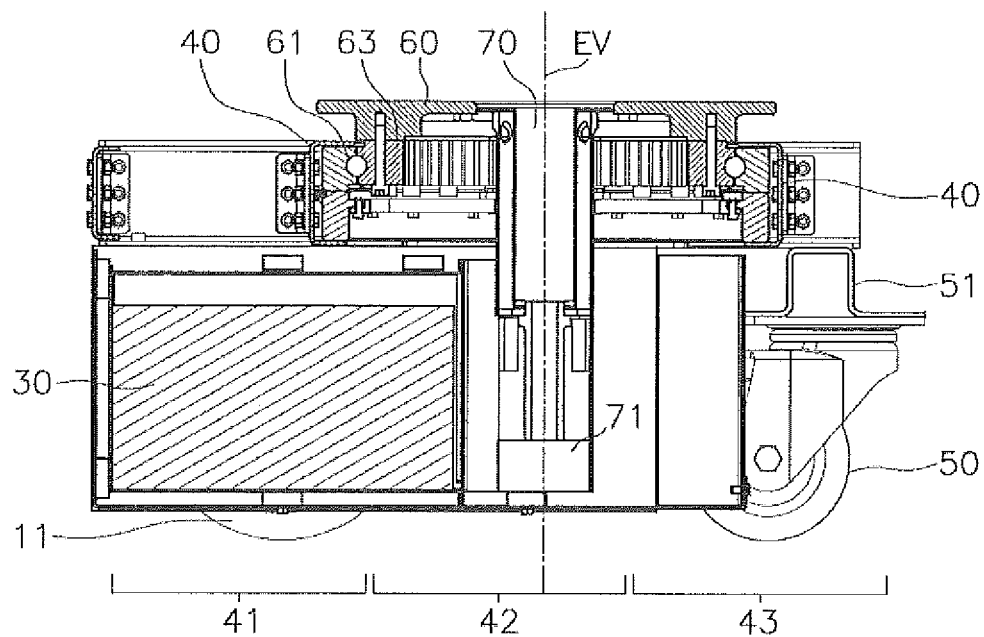
FIG. 5 shows a detailed cross-section along the vertical geometric axis of the autonomous omnidirectional drive unit shown in FIGS. 3 and 4.
Figure 6:
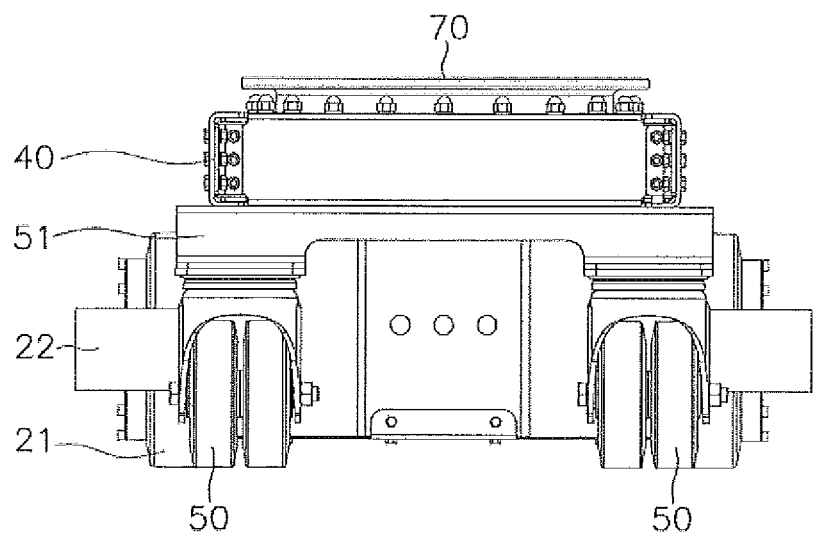
FIG. 6 shows a detailed elevational view of the rear third of the autonomous omnidirectional drive unit shown in FIGS. 3, 4, and 5.

As mentioned above, according to an additional embodiment shown in FIGS. 3 and 5, the transport platform 60 is a rotary transport platform. This allows, at the same time the autonomous omnidirectional drive unit causes rotation, the rotary transport platform 60 to constantly correct its relative angular position with respect to the rest of the autonomous omnidirectional drive unit in order to counter said rotation and remain in the same orientation, thereby obtaining lateral translation of the transport platform 60 without any change to its orientation, and therefore allowing goods supported on said transport platform 60 to be moved by means of lateral translation without rotation, even when the autonomous omnidirectional drive unit must perform complex rotation maneuvers. Said relative rotation between the transport platform 60 and the rest of the drive unit is achieved with the actuation of a rotary motor 62.

According to the preferred embodiment shown in FIGS. 3 and 5, the rotary transport platform 60 is supported on a platform gear 63, concentric with the vertical geometric axis EV, with a toothed interior and connected to the chassis along its outer perimeter through a platform bearing 61. The platform gear 63 is meshed with a turning gear 64 (shown in FIG. 3 in a simplified manner as a cylinder) connected to the rotary motor 62.

The control device 80 is configured for controlling the first motor 12, the second motor 22, and the rotary motor 62, which can be electric servomotors, to obtain in a coordinated manner omnidirectional movement of the autonomous omnidirectional drive unit.

In this embodiment, said control device 80 will be a programmable logic controller equipped with a memory and computing capacity, and it will be programmed to execute algorithms which determine the precise actuation of the first motor 12, the second motor, and the rotary motor 62 required for obtaining a controlled movement of the autonomous omnidirectional drive unit about a center of rotation coinciding with the vertical geometric axis EV.

Among other factors, said algorithms will take into account such as, for example, the diameter of the first drive wheel 11 and of the second drive wheel 12, the distance D that is the minimum distance separating the horizontal geometric axis EH from the vertical geometric axis EV.

The aforementioned caster wheels 50 will be placed in the rear third 43 of the chassis 40, providing stability to the autonomous omnidirectional drive unit as a result of the distance existing between said caster wheels 50 and the first and second drive wheels 11, 21.

The caster wheels 50 can be, for example, self-orienting wheels, like those shown in the attached drawings, although wheels of another type, such as ball or roller wheels, for example, which can move around virtually without friction in any direction, are also contemplated.

The rear third 43 may include a single caster wheel 50 which, together with the first and second drive wheels 11, 21, form a tripod which always assures constant contact of all the wheels with the ground.

Preferably, the rear third 43 will include two caster wheels 50 which will allow supporting more weight.

On perfectly even ground, it is assured that the two caster wheels 50 and the first and second drive wheels will be permanently in contact with said even ground, but in the event that there are some irregularities in said ground one of the drive wheels may occasionally lose traction causing the deviation of the drive unit.

To prevent this problem it is proposed, when there are two caster wheels 50, for both caster wheels 50 to be connected to the chassis 40 by means of a suspension element.

Figure 7:
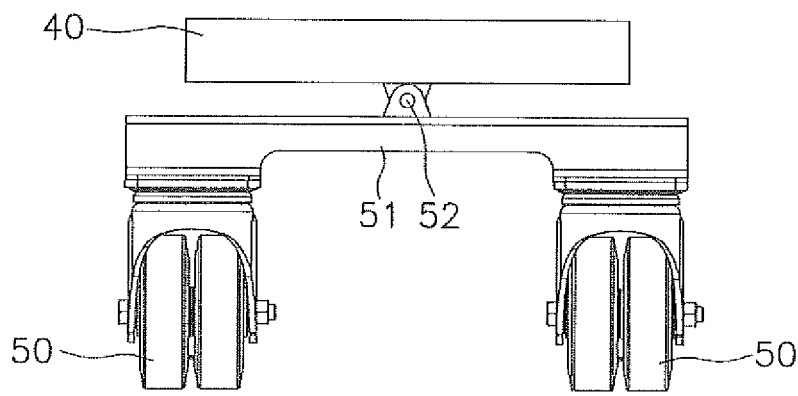
Figure 7:
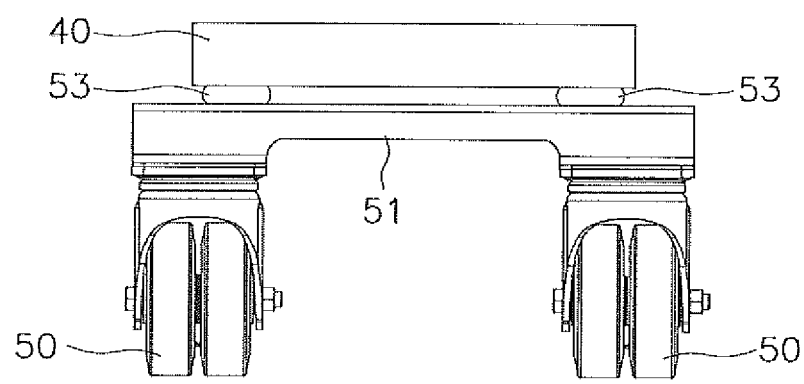
Figure 7:
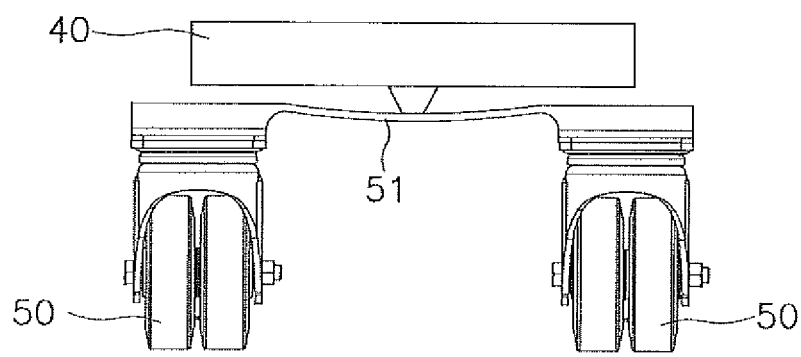

Different embodiments of said suspension element, some of which are shown in FIG. 7, are proposed.

According to a first embodiment, the two caster wheels 50 are fixed to the ends of a rigid arm 51 which is in turn connected at its center to the chassis 40 by means of an articulation 52 which allows rotation about an axis perpendicular to the vertical and horizontal geometric axes EV, EH. As the arm 51 pivots, it is assured that the four wheels of the drive unit will be in contact with the ground, even where said ground is irregular.

A second embodiment shown in FIG. 7 includes the same arm 51, but in this case it is attached to the chassis through elastic elements 53, such as, for example, springs, blocks of elastomeric material such as rubber, pneumatic pistons, etc., which drive the arm 51 in an downward vertical direction parallel to the vertical geometric axis EV, pressing the caster wheels 50 against the ground. Preferably, the movement of the arm 51 will be limited to a vertical direction by means of a guiding device.

A third embodiment also shown in FIG. 7 proposes the use of a flexible arm 51 attached at its center to the chassis 40 and with the caster wheels 50 fixed at the ends thereof.

The flexibility of the arm 51 allows its ends to be able to move vertically, causing elastic deformation of the rest of the arm 51 which will act like a spring, pushing the caster wheels 50 against the ground, assuring their constant contact with same.

It will be understood that the different parts constituting the invention described in an embodiment can be freely combined with parts described in other different embodiments even though said combination has not been explicitly described, provided that such combination is covered by claims and not detrimental.

The invention claimed is:

1. A compact autonomous omnidirectional drive unit comprising:
   a first drive assembly formed by a first drive wheel coaxial with a horizontal geometric axis, connected to a first motor, parallel to the horizontal geometric axis, through a first gearbox;
   a second drive assembly formed by a second drive wheel coaxial with the horizontal geometric axis, connected to a second motor, parallel to the horizontal geometric axis, through a second gearbox;
   a battery connected to the first and second motors;
   a chassis defining a front third, an intermediate third, and a rear third of the autonomous omnidirectional drive unit and a vertical geometric axis in a central position of the chassis, the chassis supporting the first drive assembly and the second drive assembly spaced from one another in the direction of the horizontal geometric axis, and supporting one or more caster wheels;
   a horizontal transport platform located on the chassis for transporting loads;
   a vertical housing, concentric with the vertical geometric axis and configured for allowing the passage of wiring from the drive unit to the transport platform and/or for containing a load lifting device configured for raising the transport platform or for lifting loads located on the transport platform in the direction of the vertical geometric axis;
   a control device configured for controlling the first motor and the second motor by means of control commands generated by means of a calculation to produce a planned translation of the autonomous drive unit about the vertical geometric axis;
   the one or more caster wheels are located in the rear third;
   the first motor and the second motor are located in the central third, with the vertical housing being located between them;
   the first and second drive wheels are located in the front third, with the battery being housed between them, and with the horizontal geometric axis being spaced from the vertical geometric axis by a distance;
   the control device is configured for performing the calculation directly or indirectly comprising the distance as a calculation parameter.

2. The autonomous omnidirectional drive unit according to claim 1, wherein:
   the first gearbox is at least partially surrounded by the first drive wheel, the first drive wheel being supported on a casing of the first gearbox by a first interposed bearing;
   the second gearbox is at least partially surrounded by the second drive wheel, the second drive wheel being supported on a casing of the second gearbox by a second interposed bearing.

3. The autonomous omnidirectional drive unit according to claim 2, wherein the first gearbox and the second gearbox are epicyclic gearboxes.

4. The autonomous omnidirectional drive unit according to claim 1, wherein the first motor is connected to the first gearbox through a first transmission belt or chain, and the second motor is connected to the second gearbox through a second transmission belt or chain.

5. The autonomous omnidirectional drive unit according to claim 1, wherein the transport platform is rotational about a hollow platform bearing concentric with the vertical geometric axis and is actuated by a rotary motor.

6. The autonomous omnidirectional drive unit according to claim 5, wherein the transport platform comprises a platform gear concentric with the vertical geometric axis meshed with a turning gear connected to the rotary motor.

7. The autonomous omnidirectional drive unit according to claim 6, wherein the platform gear is a circular ring defining a toothed hollow interior and the periphery of the platform gear is supported on the platform bearing.

8. The autonomous omnidirectional drive unit according to claim 1, wherein the vertical housing furthermore includes comprises rotary electrical connectors.

9. The autonomous omnidirectional drive unit according to claim 1, wherein the first drive wheel and the second drive wheel each comprises an angular position sensor which configured to communicate angular position readings to the control device, and the control device is configured for, after generating the control commands and producing the planned translation of the autonomous omnidirectional drive unit, calculating the actual translation of the autonomous omnidirectional drive unit from the angular position readings, and detecting a discrepancy between the actual translation and the planned translation.

10. The autonomous omnidirectional drive unit according to claim 9, wherein the control device is configured for performing the calculation for the generation of control commands, furthermore comprising the mentioned discrepancy detected in prior translations as a calculation parameter.

11. The autonomous omnidirectional drive unit according to claim 1, wherein the average width of the projection onto a horizontal plane of the intermediate third, in a direction parallel to the horizontal geometric axis, is greater than the average width of the projection onto a horizontal plane of the front third and greater than the average width of the projection onto a horizontal plane of the rear third in a direction parallel to the horizontal geometric axis.

12. The autonomous omnidirectional drive unit according to claim 1, wherein the maximum length of the autonomous omnidirectional drive unit, in a direction perpendicular to the horizontal and vertical geometric axes, measures at most ±15% of the length of the maximum width of the autonomous omnidirectional drive unit, in a direction parallel to the horizontal geometric axis.

13. The autonomous omnidirectional drive unit according to claim 1, wherein the caster wheels are two caster wheels connected to one another by an arm, and the arm is a rigid arm attached at the center thereof to the chassis by an articulation about an axis perpendicular to the vertical and horizontal axes; or the arm is a rigid arm connected to the chassis through one or more elastic elements subjected to compression, pushing, through the rigid arm, the caster wheels in a downward direction against a ground; or the arm is a flexible arm attached at the center thereof to the chassis, the flexible arm being subjected to flexing, pressing the caster wheels against a ground in a downward direction.

14. The autonomous omnidirectional drive unit according to claim 1, wherein each caster wheel is connected to the chassis through one or more elastic elements subjected to compression, elastically pushing the caster wheels in a downward direction against a ground.

* * * * *